(12) United States Patent
Kersey et al.

(10) Patent No.: US 6,915,048 B2
(45) Date of Patent: Jul. 5, 2005

(54) FABRY-PEROT FILTER/RESONATOR

(75) Inventors: Alan D. Kersey, Glastonbury, CT (US); Paul E. Sanders, Madison, CT (US); Martin A. Putnam, Cheshire, CT (US); Robert N. Brucato, Waterbury, CT (US); James S. Sirkis, Wallingford, CT (US)

(73) Assignee: CiDRA Corporation, Wallingford, CT (US)

( * ) Notice: Subject to any disclaimer, the term of this patent is extended or adjusted under 35 U.S.C. 154(b) by 315 days.

(21) Appl. No.: 10/173,972

(22) Filed: Jun. 17, 2002

(65) Prior Publication Data

US 2003/0231844 A1 Dec. 18, 2003

Related U.S. Application Data

(60) Provisional application No. 60/298,917, filed on Jun. 18, 2001.

(51) Int. Cl.$^7$ ................................................. G02B 6/36
(52) U.S. Cl. ............................................ 385/50; 385/13
(58) Field of Search ......................... 385/12–13, 39, 385/47, 50

(56) References Cited

U.S. PATENT DOCUMENTS

| | | | |
|---|---|---|---|
| 699,940 | A | 5/1902 | Yarrington et al. |
| 707,084 | A | 8/1902 | Carman |
| 714,332 | A | 11/1902 | Rudolph |
| 751,589 | A | 2/1904 | Westinghouse |
| 5,007,705 | A | 4/1991 | Morey et al. |
| 5,392,117 | A | * 2/1995 | Belleville et al. ............ 356/480 |
| 5,469,250 | A | 11/1995 | Holmes |
| 6,115,401 | A | 9/2000 | Scobey et al. |
| 6,137,812 | A | 10/2000 | Hsu et al. |
| 6,181,729 | B1 | 1/2001 | O'Farrell |
| 6,229,827 | B1 | 5/2001 | Fernald et al. |
| 6,310,990 | B1 | 10/2001 | Putnam et al. |
| 6,363,089 | B1 | 3/2002 | Fernald et al. |

FOREIGN PATENT DOCUMENTS

| | | |
|---|---|---|
| WO | WO 00/37914 | 6/2000 |
| WO | WO 00/37969 | 6/2000 |
| WO | WO 00/39617 | 7/2000 |

OTHER PUBLICATIONS

U.S. Appl. No. 09/707,084, filed Nov. 6, 2000, Fernald et al.
U.S. Appl. No. 09/699,940, filed Oct. 30, 2000, Sullivan et al.
U.S. Appl. No. 09/751,589, filed Dec. 29, 2000, Kersey et al.
U.S. Appl. No. 09/752,332, filed Dec. 29, 2000, Engel et al.
"Transmission filters based on periodically micro–tapered fibre," CLEO 2000, CFC4, May 12, 2000, pp. 574–575.
U.S. Appl. No. 09/455,868, filed Dec. 6, 1999, Putnam et al.
U.S. Appl. No. 09/519,220, filed Mar. 6, 2000, Bailey et al.
U.S. Appl. No. 10/151,475, filed May 17, 2002, Kersey et al.

* cited by examiner

*Primary Examiner*—Akm Enayet Ullah
*Assistant Examiner*—Jerry T Rahll

(57) ABSTRACT

A Fabry-Perot optical device, including: a large-diameter elongated optical waveguide having a core and having an air gap region disposed along the longitudinal axis of the waveguide, and with the air gap region enclosed by end faces substantially perpendicular to the longitudinal axis of the waveguide, the waveguide also having a cavity delimited on at least one side by an endface of the air gap, wherein the endface is at least partially reflective. From another perspective, the invention provides an apparatus including: a force-applying assembly, responsive to a control signal containing information about a selected resonated wavelength or a selected filtered wavelength derived from an optical signal, for providing a force; and a Fabry-Perot optical structure, responsive to the force, and further responsive to the optical signal, for providing a Fabry-Perot optical structure signal either with the selected resonated wavelength or without the selected filtered wavelength.

34 Claims, 10 Drawing Sheets

FABRY-PEROT FILTER/RESONATOR

CROSS REFERENCE TO RELATED APPLICATION

Reference is made to and priority claimed from U.S. provisional application Ser. No. 60/298,917, filed Jun. 18, 2001, entitled IMPROVED FABRY-PEROT FILTER/RESONATOR.

BACKGROUND OF INVENTION

1. Technical Field

The present invention relates to a filter or resonator; more particularly, to a tunable filter or resonator having a Fabry-Perot air gap.

2. Description of Related Art

It is known in the art to use air gap Fabry-Perot filters/resonators to provide a variety of optical functions, such as is described in U.S. Pat. No. 6,137,812 to J. T. Kringlebotn or in U.S. Pat. No. 6,181,729 to Lunt, or in U.S. Pat. No. 6,115,401 to Scobey et al., all of which are incorporated herein in their entirety.

Such Fabry-Perot filters are created by epoxying optical fibers within a tube and spacing the ends a precise distance apart. However, such filters cannot tolerate high temperature operations and do not exhibit good long-term stability. Further, they are difficult to tune. Those that are tunable are typically tuned by changing the temperature of the filter package or other similar techniques. Fabry-Perot filters tuned in such ways exhibit creep hysteresis and other fiber attachment problems.

SUMMARY OF INVENTION

Accordingly, the present invention provides an apparatus serving as a Fabry-Perot optical device, including: a large-diameter elongated optical waveguide having a core and having an air gap region oriented along the longitudinal axis of the waveguide substantially coincident with a length of the core so as to provide an interval of the waveguide with the core removed, and with the air gap region enclosed by end faces substantially perpendicular to the longitudinal axis of the waveguide, the waveguide also having a cavity delimited on at least one side by an endface of the air gap, wherein the endface is at least partially reflective.

In a further aspect of the invention, the cavity is further delimited by the other of the two endfaces of the air gap, and in a still further aspect of the invention, the apparatus also includes a Bragg grating inscribed in the core of the waveguide, and the cavity is further delimited by the Bragg grating. In some corresponding applications, the air gap, the Bragg grating, and the reflectivity of the endfaces of the air gap are disposed so that the air gap is external to the cavity, and in other corresponding applications, the air gap, the Bragg grating, and the reflectivity of the endfaces of the air gap are disposed so that the air gap is encompassed by the cavity.

From another perspective, the invention provides an apparatus serving as a Fabry-Perot optical device, including: a force-applying assembly, responsive to a control signal containing information about a selected resonated wavelength or a selected filtered wavelength derived from an optical signal, for providing a force; and a Fabry-Perot optical structure, responsive to the force, and further responsive to the optical signal, for providing a Fabry-Perot optical structure signal either with the selected resonated wavelength or without the selected filtered wavelength. From this perspective, in a further aspect of the invention, the Fabry-Perot optical structure includes a glass tube having a bore with two fibers positioned therein, the glass tube being collapsed onto the two fibers leaving a gap or cavity between two fiber end faces of the two fibers; and in another further aspect of the invention, the Fabry-Perot optical structure is a dogbone structure having wider end portions separated by a narrower intermediate portion.

The present invention thus provides an improved Fabry-Perot filter and a tunable Fabry-Perot optical device having a force-applying assembly in combination with a tunable Fabry-Perot optical structure based on a so-called cane waveguide structure or large-diameter waveguide, usually provided as a dogbone structure.

The Fabry-Perot filter of the present invention may be used by itself or with an athermalized package and may be provided as a tunable filter. When used as a tunable filter, the force-applying assembly responds to a control signal containing information about a selected resonated wavelength(s) or a selected filtered wavelength derived from an optical signal, for providing a force to the tunable Fabry-Perot optical structure.

When the tunable Fabry-Perot optical structure is based on a dogbone structure type of cane waveguide (large-diameter waveguide), it has wider end portions separated by a narrower intermediate portion, making possible a (compressive) stress multiplying effect in that force distributed over the end sections is communicated to the intermediate portion undiminished, producing a larger stress (force per unit area) in the intermediate portion. In this case, the narrower intermediate portion has a Fabry-Perot interferometer arranged therein. The tunable Fabry-Perot optical structure may also be a cylindrical tubular structure.

The tunable Fabry-Perot optical structure may include a glass tube having a bore with two fibers positioned therein, the glass tube being collapsed onto the two fibers leaving a gap or cavity between two fiber end faces of the two fibers. The gap or cavity between the fiber end faces forms an interferometric cavity. One or more of the fiber end faces may be coated with a high reflectivity coating.

The tunable Fabry-Perot optical structure may also include a single large diameter waveguide known as a cane waveguide structure.

The force-applying assembly may include an actuator, including a piezoelectric actuator or stepper motor, arranged in a housing or any other device that applies an axial compressive force on the optical structure or element. The tunable Fabry-Perot optical structure may be arranged between a wall of the housing and the actuator under slight compression. In the case of the piezoelectric actuator, the control signal may be an applied stepper voltage signal to the piezoelectric actuator.

In one embodiment, the tunable Fabry-Perot optical structure has a longitudinal axis; the tunable Fabry-Perot optical structure has a Fabry-Perot structure arranged along the longitudinal axis; and the force is applied along the longitudinal axis. The force may be a compression force that presses or squeezes the tunable Fabry-Perot optical structure, or a tension force that pulls, stretches, or elongates the tunable Fabry-Perot optical structure.

The tunable Fabry-Perot optical device may be an optical filtering, sensing or resonating device.

The tunable Fabry-Perot optical structure may include a glass tube having a core and an etched area and having a slit perpendicular to its longitudinal axis and extending across the width of the tube but only to a depth just beyond where the core is located, to form a Fabry-Perot cavity therein. The core has coated faces.

The tunable Fabry-Perot optical structure may also include a glass tube having a core and an etched area and having a slit formed parallel to its longitudinal axis with a width substantially the same as that of the core and extending to a depth just beyond where the core is located, to form a Fabry-Perot cavity therein. The core again has coated faces.

The foregoing and other objects, features and advantages of the present invention will become more apparent in light of the following detailed description of exemplary embodiments thereof, as illustrated in the accompanying drawing.

BRIEF DESCRIPTION OF THE DRAWING

The drawing includes numerous Figures, and the following is a brief description thereof.

DETAILED DESCRIPTION OF THE INVENTION

The invention is a tunable Fabry-Perot optical structure based on a large-diameter optical waveguide, also called a cane waveguide structure.

Figure 1:
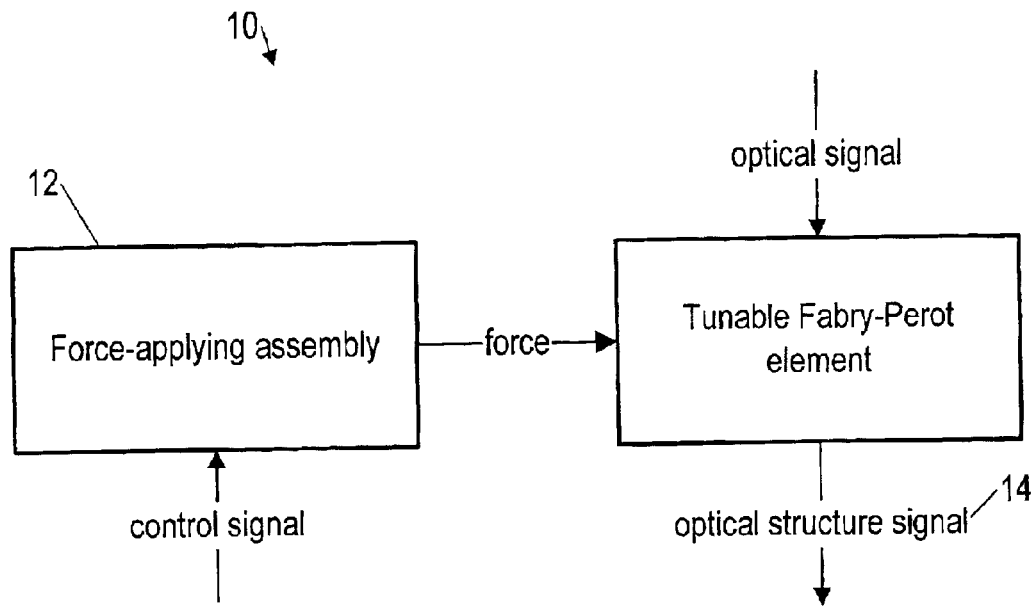
FIG. 1 is a block diagram of a tunable Fabry-Perot optical device that is the subject matter of the present invention.

FIG. 1 shows a tunable Fabry-Perot optical device generally indicated as 10 having a force-applying assembly 12 in combination with a tunable Fabry-Perot optical structure 14, which are both shown and described in more detail below.

In operation, the force-applying assembly 12 provides a force to tune the Fabry-Perot optical structure 14 in response to a control signal containing information indicative of a selected wavelength(s) to be filtered from an optical signal. The tuning is accomplished when the applied force causes a change in a gap or cavity in the Fabry-Perot optical structure, a gap or cavity in which multiple reflections occur, as in a laser cavity, so that only light of certain wavelengths (those that fit into the gap an integral number of times) survive the reflection process, the other wavelengths are eliminated because of destructive interference with the reflected light. One surface of the gap or cavity is coated to be more reflecting than the other, and which is the less reflective determines where the selected out light will (for the most part) emerge from the cavity. The selected out light can be made to emerge along the same path as the incident light, and by including a circulator (a device that is sensitive to the direction of propagation of light passing through it) in the path, the selected out light can then be diverted to a final path different from the path of the incident light.

The tunable Fabry-Perot optical structure 14, in response to the force applied by the force-applying assembly 12, functions as a bandpass filter that passes the selected wavelength, and filters or blocks the remaining wavelengths of the input optical signal; or functions as a bandstop filter that filters or blocks the selected wavelength and passes the remaining wavelengths of the input optical signal.

A Fabry-Perot optical structure functions as a filter (either a notch filter or a bandpass filter, depending on how it is configured, as will be discussed more fully herein after) to select out from light of many wavelengths those wavelengths that fit into the gap of the Fabry-Perot optical structure an integral number of times. (A Fabry-Perot optical structure is also called more appropriately a Fabry-Perot interferometer when used as a measuring device such as a device to measure wavelength). In order to form a filter having a periodic transmission "grid" at 0.4 nm spacings, the device would include about a 3 mm long air-gap cavity. In order to design a device for filtering a few periods within the C band, the gap would be in the 10–50 $\mu$m range. Since the gap of a Fabry-Perot optical structure is large compared to a typical wavelength of light (typically 3 cm for the gap compared to 500 nm for green light), depending on the light being filtered, there are usually many different wavelengths satisfying the condition for filtering, i.e. if g is the gap length, both light of wavelength $\lambda_1$ and light of wavelength $\lambda_2$ will satisfy the filtering condition if there are integers $n_1$ and $n_2$ such that, $$g=n_1\lambda_1=n_2\lambda_2.$$

Figure 2:
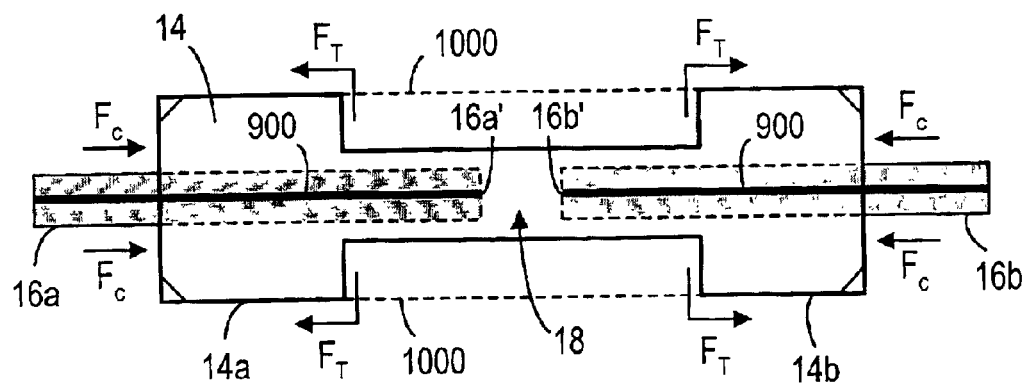
FIG. 2 is a diagram of one embodiment of a tunable Fabry-Perot optical structure that is a part of the tunable Fabry-Perot optical device shown in FIG. 1.

FIG. 2 shows, by way of example, the tunable Fabry-Perot optical structure 14 shown in FIG. 1.

As shown, the tunable Fabry-Perot optical structure 14 is based on a cane waveguide preferably in the form of a dogbone structure having wider end portions 14a, 14b separated by a narrower intermediate portion 14c, making possible a (compressive) stress multiplying effect in that force distributed over the end portions is communicated to the intermediate portion undiminished, producing a larger stress (force per unit area) in the intermediate portion.

The dogbone structure is only one form of what is called a cane waveguide structure. The dogbone structure can, for example, be formed by grinding. An alternative structure having uniform thickness along its length (i.e. a simple cylindrical or rectangular structure) is also indicated by dashed lines 1000.

The tunable Fabry-Perot optical structure 14 may be formed in certain embodiments from a glass tube having a bore with two optical fibers 16a, 16b positioned therein, then the glass tube is collapsed onto the two optical fibers 16a, 16b so that the cladding of the two optical fibers becomes substantially indistinguishable from the material of the glass tube, and leaving a tunable Fabry-Perot interferometric gap or cavity 18 between two fiber end faces 16a', 16b', of the two fibers 16a, 16b in the narrower intermediate portion 14c. The optical fibers 16a, 16b can be fused inside the bore of the glass tube 20 by any one or more processes that are known in the art, including by collapsing, for example, a 1 millimeter glass tube onto two sections of optical fiber forming a collapsed 1 millimeter tube, then collapsing a 3 millimeter glass tube onto the collapsed 1 millimeter tube. It should be appreciated by those skilled in the art that the various inside diameters and outside diameters of the fiber, inner tube and outer tube are selected to accomplish a collapse process which yields the optical structure 14 wherein the various components are fused together to form the structure as described herein above. In addition, it should be further appreciated by those skilled in the art that the sizes of that various components are shown by way of example and that fibers and tubes of other sizes are contemplated by the present invention. The tunable Fabry-Perot optical structure 14 can be made using the glass collapsed technology shown and described in the aforementioned U.S. patent application Ser. No. 09/455,867 (CiDRA File No. CC-0036B) and Ser. No. 09/455,865 (CiDRA File No. CC-0078B). One or more of the fiber end faces 16a', 16b' (see FIG. 4) may be coated with a high reflectivity coating. The scope of the invention is intended to include the formation of the tunable Fabry-Perot optical structure 14 using any one or more of the different glass collapsing technologies known in the art.

Moreover, the tunable Fabry-Perot optical structure 14 may also be formed from a single large diameter cane waveguide. The cane waveguide may be formed by drawing a large diameter perform, possibly fabricated by the well known MCVD process, to a suitable diameter having a core section and at least one cladding section surrounding the core.

In embodiments where the Fabry-Perot optical structure 14 is formed from a single large diameter cane waveguide, separate optical fibers 16a, 16b are attached to the cane via a pigtailing (or other) process to transmit light to/from the structure. For examples of embodiments of cane waveguide structures, see U.S. patent application Ser. No. 09/455,868 (CiDRA File No. CC 0230), entitled Large Diameter Optical Waveguide, Grating, and Laser, filed Dec. 6, 1999, as well as U.S. patent application Ser. No. 09/456,112 (CiDRA File No. CC 0129B), entitled Compression-Tuned Bragg Grating and Laser, filed Dec. 6, 1999, both hereby incorporated by reference in their entirety. See also U.S. patent application Ser. No. 09/455,867 (CiDRA File No. CC 0036B), discussed above. As disclosed in these references and as indicated in FIG. 2, a cane waveguide structure such as that serving as the basis for the Fabry-Perot optical structure 14 of the invention, has at least one core 900 surrounded by material serving as cladding. A cane waveguide typically comprises silica glass ($SiO_2$) based material having dopants, as is known, to allow light to propagate in either direction along the core and/or within the cane waveguide. Other materials for the cane waveguide may be used if desired. For example, the cane waveguide may be made of any glass, e.g., silica, phosphate glass, or other glasses; or solely plastic. The cladding material has an outer dimension of at least about 0.3 mm and the core has an outer dimension such that it propagates only a few spatial modes (e.g., less than about 6). For example, for single spatial mode propagation, the core has a substantially circular transverse cross-sectional shape with a diameter less than about 12.5 microns, depending on the wavelength of light. The cane waveguide will also work with larger or non-circular cores that propagate a few (less than about 6) spatial modes, in one or more transverse directions. The outer diameter of the cladding and the length of the cane waveguide have values such that the cane waveguide resists buckling when placed in axial compression as indicated by the arrows labeled $F_C$. As shown, the tunable Fabry-Perot optical structure 14 may be subjected to two different kinds of forces, i.e. either a compression force ($F_C$) or a tension force ($F_T$) which is applied by the force assembly 12 shown in FIG. 1. The tunable Fabry-Perot optical dogbone structure 14 causes an amplification of either of these applied forces. The amplification is analogous to Pascal's Principle in fluid dynamics, where an external pressure applied to a fluid confined within a closed container is transmitted undiminished throughout the entire fluid, so pressure is applied as a function of force per unit area in the "dogbone" structure 14. The amplified compression or tension force (FC, FT) changes the optical characteristic of the tunable Fabry-Perot interferometric gap or cavity 18 to provide a desired filtering response consistent with that discussed herein.

Embodiments are also envisioned in which the tunable Fabry-Perot optical structure 14 may also be in the form of a cylindrical tubular structure, instead of a dogbone structure.

Figure 3:
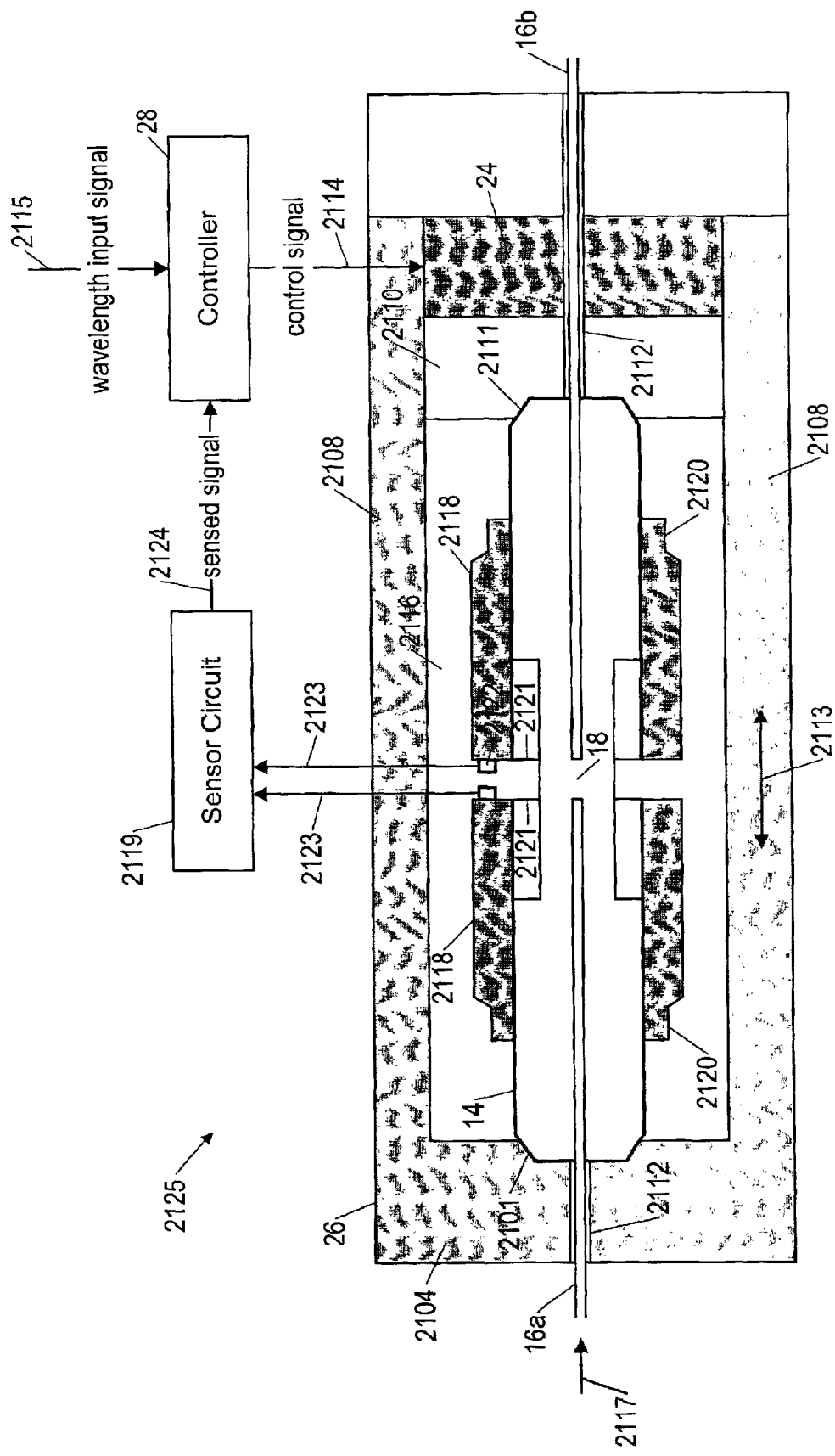
FIG. 3 is a diagram of an embodiment of the tunable Fabry-Perot optical device shown in FIG. 1 having two cores for conveying optical signals separated by an air gap.

FIG. 3 shows in detail one embodiment of the tunable Fabry-Perot optical device 125 having two fibers 16a, 16b separated by the tunable Fabry-Perot interferometric gap or cavity 18. To provide the necessary accuracy to precisely tune the optical Fabry-Perot element, the tunable device 2125 compresses axially the Fabry-Perot element using a non-optical closed control loop. The tuning device, as will be described in greater detail hereinafter, is similar to that disclosed in co-pending U.S. patent application Ser. No. 09/707,084 entitled Compression Tuned Bragg Grating and Laser, incorporated herein by reference in its entirety, and co-pending U.S. patent application Ser. No. 09/455,868 entitled Large Diameter Optical Waveguide, Grating, and Laser, already incorporated above by reference in its entirety.

The Fabry-Perot element or structure 14 is compressed axially within a housing of the tuning device. One end of the Fabry-Perot element 14 is pressed against a seat 2101 in one end 2104 of the housing 26. The housing also has a pair of arms (or sides) 2108, which guide a movable block 110. The block 110 has a seat 111 that presses against the other end of the Fabry-Perot element 14. The axial end faces of the Fabry-Perot element 14 and/or the seats on mating surfaces 2101 and 2111 may be plated with a material that reduces stresses or enhances the mating of the Fabry-Perot element 14 with the seat on the mating surfaces. The ends of the housing 26 and the block 2110 have a bore 2112 drilled through them to allow the fiber 16a, 16b to pass therethrough. Instead of the recessed seats 2101 and 2111, the end 2104 of the housing 26 and the block 2110 may provide a planar surface for engaging flush with the respective ends of the Fabry-Perot element 14.

The housing 26 may be assembled such that a pre-strain or no pre-strain exists on the Fabry-Perot element 14 prior to applying any outside forces.

An actuator 24, such as a piezoelectric transducer (PZT) actuator, engages the moveable block 2110, which causes the block to move as indicated by arrows 113. Accordingly, the PZT actuator 24 provides a predetermined amount of force to the moving block 2110 to compress the Fabry-Perot element 14, and thereby tune the gap 18 to a desired reflection, filtering, or resonant wavelength. In response to control signal generated by a displacement control circuit or controller 28 via conductor 2114, the PZT actuator 24 is energized to provide the appropriate compression force necessary to tune the Fabry-Perot element to the desired reflection, filtering, or resonant wavelength by adjusting the width of the gap 18. The control circuit 28 adjusts the expansion and retraction of the actuator 24 in response to an input command 2115 and a displacement sensor 2116 that provides feedback representative of the strain or compression of the Fabry-Perot element 14 to form a non-optical closed-loop control configuration. In other words, light 2117 propagating through the network or device is not used to provide feedback for the tuning of the gap 18.

In one embodiment, the displacement sensor 2116 includes a pair of capacitive elements 2118 and a known displacement sensor circuit 2119, similar to that disclosed in co-pending U.S. patent application Ser. No. 09/519,802 entitled, Tunable Optical Structure Featuring Feedback Control, filed Mar. 6, 2000, which is incorporated by reference in its entirety. The capacitive elements may be formed of glass, plastic or other material. The capacitive elements 2118 are mounted, such as by welding or using epoxy, to respective ends of the Fabry-Perot element 14 at 2120 such that the capacitive surfaces 2121 are spaced a predetermined distance apart, for example, approximately 1 or 2 microns. Other spacings may be used if desired. The capacitive elements 2118 may be bonded or secured using an epoxy or other adhesive compound, or fused to Fabry-Perot element 14 using a $CO_2$ laser or other heating element. The capacitive surfaces 2121 are coated with a metallic coating, such as gold, to form a pair of annular capacitive plates 2122. The change in capacitance depends on the change in the spacing between the capacitive plates.

Electrodes 2123 are attached to the capacitive plates 2122 to connect the capacitor to the sensor circuit 2119. The sensor circuit 2119 measures the capacitance between the capacitive plates 2122, and provides a sensed signal 2124, indicative of the measured capacitance, to the displacement controller 28. As the Fabry-Perot element 14 is strained, the gap between the parallel capacitive plates 2122 will vary, thereby causing the capacitance to change correspondingly. Specifically, as the gap is compressed, the gap between the capacitive plates 2122 is reduced, resulting in an increase in capacitance. The change in capacitance is related to the change in the reflection, filtering, or resonant wavelength $\lambda_b$ of the gap 18. Since the capacitive elements 2118 are directly connected to the Fabry-Perot element 14, the capacitive elements are passive and will not slip. One skilled in the art would be able to implement without undue experimentation, the sensor circuit 2119 to measure the change in capacitance between the two capacitive plates 2122.

In the operation of the Fabry-Perot control unit 2125, the controller 28 receives the wavelength input signal 2115, which represents the desired reflection, filtering, or resonant wavelength to tune the Fabry-Perot gap 18. In response to the input signal 2115 and the sensed signal 124 representative of the present reflection, filtering, or resonant wavelength of the gap 18, the controller 28 provides a control signal 2114 to the actuator 24 to increase or decrease the compression force applied to the Fabry-Perot element 14 to set the desired width of the gap 18. The change in applied force to the Fabry-Perot element 14 changes the spacing or width of the gap 18, and therefore, the spacing between the capacitive plates 2122. As described above, the change in spacing of the capacitive plates 2122 changes the capacitance therebetween provided to the sensor circuit 2119, which provides displacement feedback to the controller 28. While the sensor circuit 2119 and the controller 28 have been shown as two separate components, one would recognize that the functions of these components may be combined into a single component. One example of a closed loop actuator 24 that may be used is Model No. CM (controller) and DPT-C-M (for a cylindrical actuator) made by Queensgate, Inc. of N.Y.

Although the invention has been described with respect to using a capacitor 2116 to measure the gap distance, it should be understood by those skilled in the art that other gap sensing techniques may be used, such as inductive, optical, magnetic, microwave, time-of-flight based gap sensors. Moreover, the scope of the invention is also intended to include measuring or sensing a force applied on or about the compressive element, and feeding it back to control the compression tuning of the optical structure. While the embodiment of the present invention described herein before includes means to provide feedback of the displacement of a Fabry-Perot element 14, one should recognize that the elements may be accurately and repeatably compressed and thus may operate in an open loop mode.

Alternatively, instead of using a piezoelectric actuator 24, the Fabry-Perot element 14 may be compressed by another actuator, such as a solenoid, pneumatic force actuator, or any other device capable of directly or indirectly applying an axial compressive force on the Fabry-Perot element 14. Further, a stepper motor or other type of motor whose rotation or position can be controlled may be used to compress the Fabry-Perot element. A mechanical linkage connects the motor, e.g., a screw drive, linear actuator, gears, and/or a cam, to the movable block 2110 (or piston), which cause the block to move as indicated by arrows 2113, similar to that described in pending U.S. patent application Ser. No. 09/751,589 entitled Wide Range Tunable Optical Filter, filed Dec. 29, 2000 (CC-0274A); and U.S. patent application Ser. No. 09/7114,332 entitled Actuator Mechanism for Tuning an Optical Device, filed Dec. 29, 2000. (CC-0322), both incorporated herein by reference. The movable block 2110 moves back and forth in the direction of the axis of compression, indicated by arrows 113; the axis of compression is parallel with the longitudinal axis of the glass tube or the single large diameter waveguide or dogbone structure that forms the tunable Fabry-Perot optical structure 14.

The stepper motor may be a high resolution stepper motor driven in a micro stepping mode, such as that described in the aforementioned U.S. Pat. No. 5,469,1140, Compression Tuned Fiber Grating, to Morey et al, (e.g., a Melles Griot NANOMOVER), incorporated herein by reference.

Alternatively, the gap may be tuned by mechanically stressing (i.e. tension, bending) the Fabry-Perot elements, or varying the temperature of the gap (i.e., using a heater), such as is described in U.S. Pat. No. 5,007,705, entitled Variable Optical Fiber Bragg Filter Arrangement, to Morey et al., incorporated herein by reference.

The control electronics unit 28 may also be considered a part of the compression force assembly 12 (FIG. 1) without deviating from the scope of the invention.

Figure 4A:
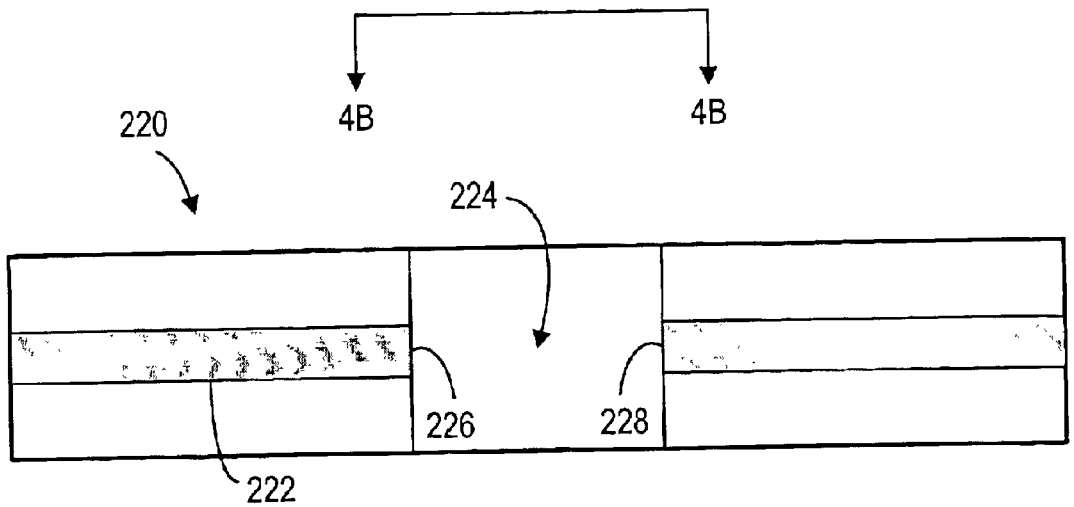
FIG. 4A is a top view of a glass tube having a perpendicular slit therein.
Figure 4B:
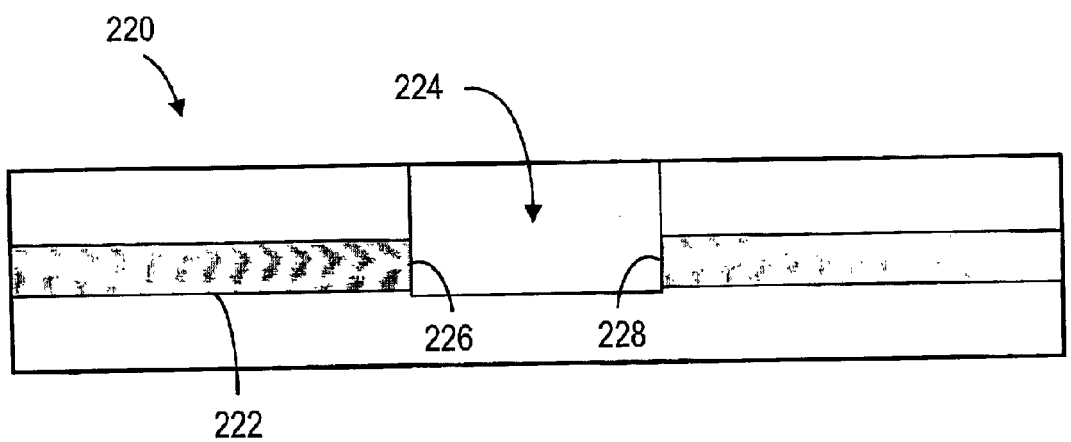
FIG. 4B is a side view of the glass tube shown in FIG. 4A.
Figure 5A:
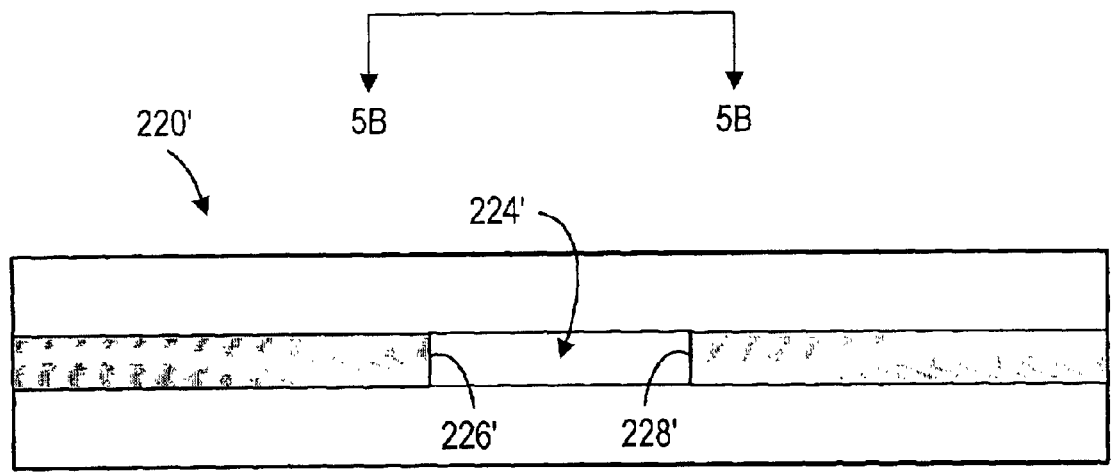
FIG. 5A is a top view of a glass tube having a parallel slit therein.
Figure 5B:
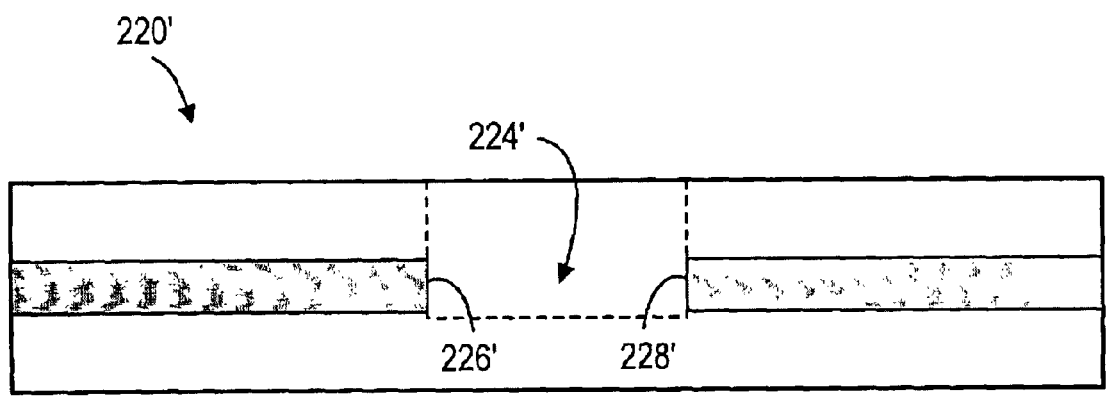
FIG. 5B is a side view of the glass tube shown in FIG. 5A.

Referring now to FIGS. 4 and 5, in certain embodiments of the Fabry-Perot optical structure of the present invention, the air gap may be formed in a large-diameter optical waveguide of uniform thickness, by etching or machining away (or otherwise forming) a slit in the structure 220 perpendicular (FIGS. 4A, 4B) to the core 222. In so forming the slit, material is removed along the length of the core at a predetermined width defining the Fabry-Perot air gap. The slit is formed through the cladding to a depth down to and extending just past the core, but not extending appreciably past the core. Alternatively, The Fabry-Perot air gap may be formed by etching, machining (or otherwise forming) a slit parallel (FIGS. 5A, 5B) to the core 222 In this particular embodiment material is removed along some length of the core 222 the width of the optical structure 220' down to and including the core, but not extending appreciably past the core. In either case, inside ends, or faces, 226 228 226' 228' of the core are polished and can be coated to obtain desired transmission and reflective properties. This etching or machining can be done to provide various Fabry-Perot gaps of predetermined nominal sizes. In certain embodiments, the large diameter optical waveguide can then be machined to a dogbone structure to enhance its tunability, i.e. to allow adjusting the width of the air gap (measured along the longitudinal axis of the optical structure) with less compressive stress applied to the ends of the optical structure than would be needed for a non-dogbone structure, as described herein before with reference to FIG. 2. In embodiments where the Fabry-Perot optical structure is formed from a single large diameter waveguide structure, separate optical fibers may be attached to the structure via a pigtailing (or other) process to transmit light to/from the structure.

For example, FIGS. 4A and 4B show a glass tube 220 in which a slit is formed by removing material from the waveguide structure in a cut made perpendicular to the core 222, an air gap 224 thereby being formed serving as a Fabry-Perot cavity. Even though the glass tube of FIGS. 4A and 4B is cylindrical, FIG. 4A might be called a plan view or top view, and FIG. 4B might be called a side view or elevation view. Material is removed from the waveguide structure through the cladding to a point just past the core 222, leaving behind an approximately hemispheric portion of material connecting the two sides of the waveguide on either side of the air gap 224. As shown, the waveguide structure 220 has a core 222 on each side of the gap 224. In certain embodiments either one or both of the faces 226, 228 may be coated with a reflective material, such as gold. As illustrated in the figure An alternative embodiment of the present invention is best shown in FIGS. 5A and 5B wherein a slit is formed in waveguide structure 220' by removing material from the glass tube parallel to the core 222', forming an air gap 224' thereby serving as a Fabry-Perot cavity. As in the perpendicular cut shown in FIGS. 4A and 4B, the slit is formed so as to remove material through the cladding and just through and past the core 222. In contrast with embodiments of the present invention having a perpendicular slit as shown in FIGS. 4A and 4B, embodiments having a Fabry-Perot gap formed by a parallel slit in the waveguide structure the slit can be a relatively narrow slit along the length of the fiber, a slit that need only be slightly wider than the core, leaving behind almost the entire cylinder of waveguide structure 220'. As described herein before, either one or both of the faces 226, 228 may be coated with a reflective material, such as gold.

The tunable Fabry-Perot optical device may be a part of a compression-tuned Bragg grating based reconfigurable wavelength channel add/drop multiplexer, similar to that shown and described in a U.S. patent application filed with Ser. No. 09/519,220 (WFVA/CiDRA File Nos. 712-002-083/CC-00204), filed Mar. 6, 2000, hereby incorporated by reference in its entirety. The tunable Fabry-Perot optical device may also be a part of a tunable optical structure featuring feedback control, similar to that shown and described in a U.S. patent application filed with Ser. No. 09/519,802 (WFVA/CiDRA File Nos. 712-002-082/CC-00238), filed Mar. 6, 2000, now issued as U.S. Pat. No. 6,310,990, and hereby incorporated by reference in its entirety.

Figure 6:
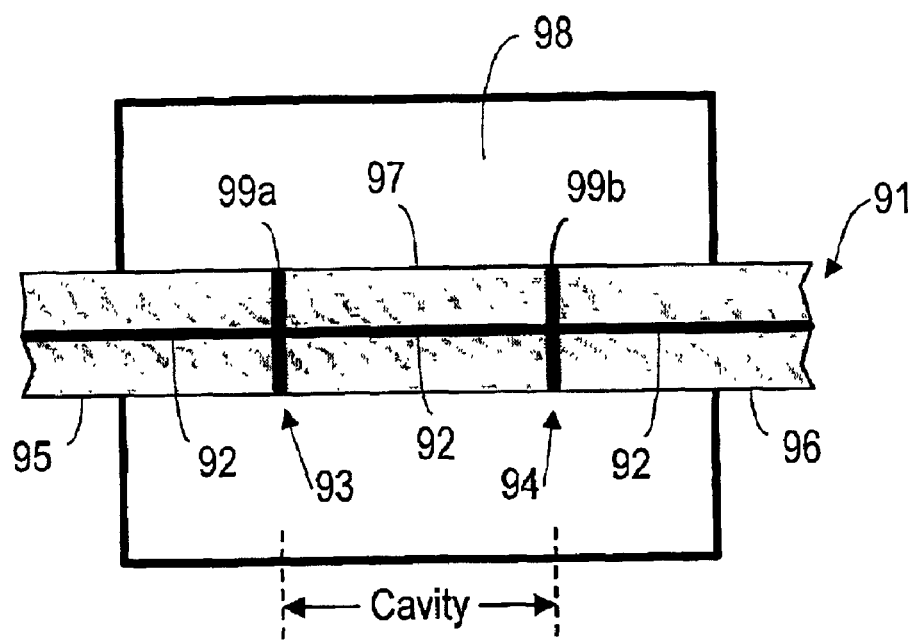
FIG. 6 is a side view of a first additional alternative embodiment of a tunable Fabry-Perot optical structure according to the invention.

Referring now to FIG. 6, there is shown an alternative embodiment of the invention comprising a standard optical fiber 91 having a core 92 that is cleaved (or otherwise terminated) at two locations 93, 94 to provide a pair of outer sections of fiber 95, 96 and an intermediate section of fiber 97. The length of the intermediate section corresponds to the desired cavity length of the Fabry-Perot cavity. A partially reflective material is sputtered (or otherwise coated) on the ends of the intermediate section of fiber 97 (at the locations 93, 94 where the fiber was cleaved) to form the Fabry-Perot cavity, i.e. so that the Fabry-Perot cavity is bounded by two layers 99a, 99b of partially reflective material at either end of the intermediate section. The three sections 95, 96, 97 of the optical fiber 91 are inserted within a tube 98 formed of silica or another suitable dielectric (i.e. properly transparent and with a suitable index of refraction), with the two outer sections 95, 96 abutting the intermediate section 97 and wherein the cores 92 of all three sections are maintained within optical alignment within the tube 98. The silica tube is then collapsed and fused (or otherwise attached) onto the three sections of the optical fiber. Instead of coating the ends of the intermediate section of the optical fiber with partially reflective material, the ends of the pair of outer sections of the fiber, which abut the intermediate section, may be coated with the partially reflective material.

Figure 7:
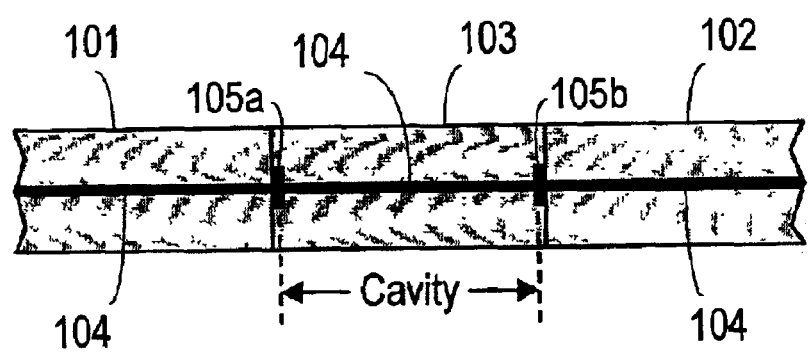
FIG. 7 is a side view of a second additional alternative embodiment of a tunable Fabry-Perot optical structure according to the invention.

Referring now to FIG. 7, in an alternative embodiment of the invention, a Fabry-Perot resonator is formed of three large-diameter waveguides (also called cane waveguides as described herein above): a pair of outer waveguides 101 102 and an intermediate waveguide 103, each having a core 104. The length of the intermediate waveguide corresponds to the desired cavity length of the Fabry-Perot cavity. An axial portion of each end of the intermediate waveguide is countersunk by machining or grinding to a pre-determined depth, and a partially reflective material is sputtered on the countersunk surfaces to form a Fabry-Perot cavity, bounded by two layers 105a 105b of partially reflective material at either end of the intermediate section. Ideally, the thickness of the partial reflective material is made substantially equal to the depth of the counter bore so that the reflective material is coplanar with the end surfaces of the intermediate waveguide. The outer waveguides are then optically coupled by any known method such as fusion splicing, epoxying or other non-epoxy optical connection, to the ends of the intermediate waveguide so as to be abutting as described herein above with reference to FIG. 6. The countersinking of the reflective material leaves some glass on the outer radial portions at the ends of the intermediate waveguide, and so provides opposing flat glass surfaces to enable fusion splicing of the outer waveguides to the intermediate waveguide without adversely affecting the reflective material. While the ends of the intermediate waveguide are countersunk and coated with partial reflective material, one skilled in the art will recognize and appreciate that the ends of the pair of outer waveguides, which abut the intermediate waveguide, may instead be countersunk and coated with the partial reflective material.

Figure 8A:
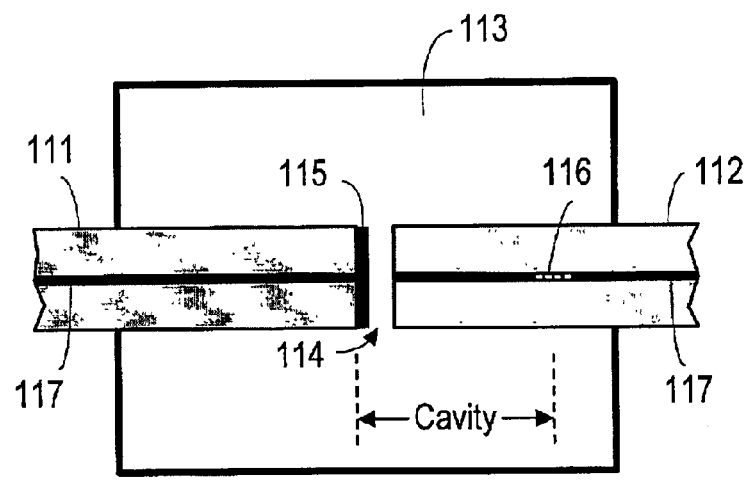
FIGS. 8A and 8B are side view of a third additional alternative embodiment of a tunable Fabry-Perot optical structure according to the invention.

Referring now to FIG. 8A, in an alternative embodiment of the invention, a Fabry-Perot resonator is formed of an input optical fiber 111 and an output optical fiber 112, onto which a silica tube 113 is collapsed and fused with an air gap separating the input optical fiber from the output optical fiber. Each of the optical fibers 111 112 has a core 117. The axial end of the input fiber is coated with at least a partial reflective coating 115 to form one of the reflective surfaces of the Fabry-Perot resonator. The other reflective surface of the Fabry-Perot cavity is provided by a Bragg grating 116 inscribed in the output optical fiber at a desired distance from the reflective end surface of the input optical fiber. (Alternatively, the surface of the waveguide exposed to the air gap adjacent to the grating may be coated with an anti-reflective coating, and the other surface may be coated with at least a partial reflective coating.) The distance between the reflective coating 115 and the Bragg grating 116 is the cavity length of the Fabry-Perot resonator. The air gap 114 is preferably a small air gap, and the Bragg grating is a high reflectivity grating; the combination of the reflectivity of the grating and the gap length are selected to provide a filter having the appropriate characteristics for filtering out a preselected bandwidth(s) of light.

Figure 8B:
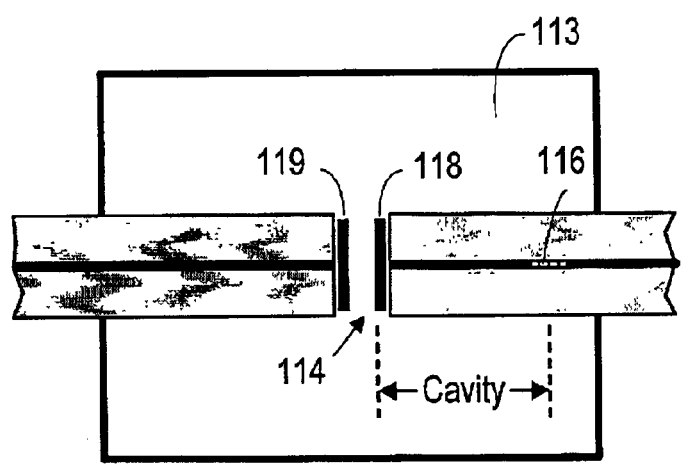

Alternatively, referring now to FIG. 8B, instead of a partial reflective coating at the end of the input fiber at the air gap 114, the end of the output fiber at the air gap (the fiber having the grating) may be coated with a reflective coating 118, and the end of the input fiber at the air gap may be coated with an anti-reflective coating 119. In such an arrangement, the air gap is outside of the Fabry-Perot cavity.

Figure 9A:
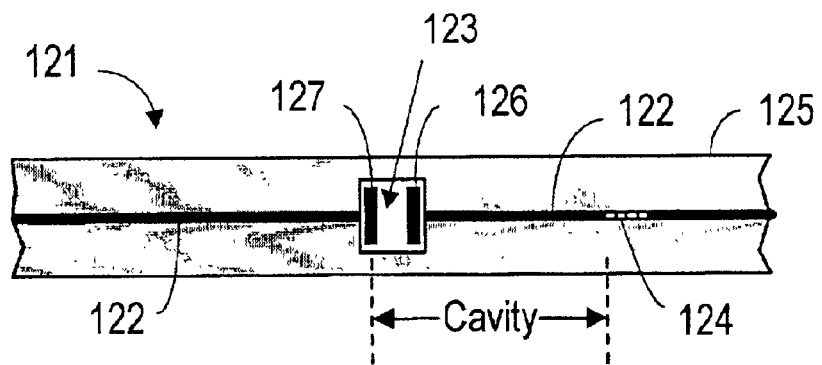
FIGS. 9A and 9B are side views of a fourth additional alternative embodiment of a tunable Fabry-Perot optical structure according to the invention.

Referring now to FIG. 9A, in an alternative embodiment of the invention, a Fabry-Perot filter/resonator is formed of a large-diameter waveguide or cane waveguide 121, with a portion of the core 122 removed by, for example, cutting or etching, leaving behind an air gap 123, and includes a Bragg grating 124 written into the core a predetermined distance from the air gap. The air gap is preferably formed by machining, cutting, drilling or grinding a slit partially through the cane sufficient to create the air gap within the core, but leaving a portion of the cladding 125 intact. The surface of the waveguide exposed to the air gap (serving as a wall of the air gap) adjacent to the grating may be coated with an anti-reflective coating 126, and the other surface may be coated with at least partial reflective coating 127. The region between the wall of the air gap on the far side from the Bragg grating and the Bragg grating itself forms the cavity of the Fabry-Perot optical structure.

Figure 9B:
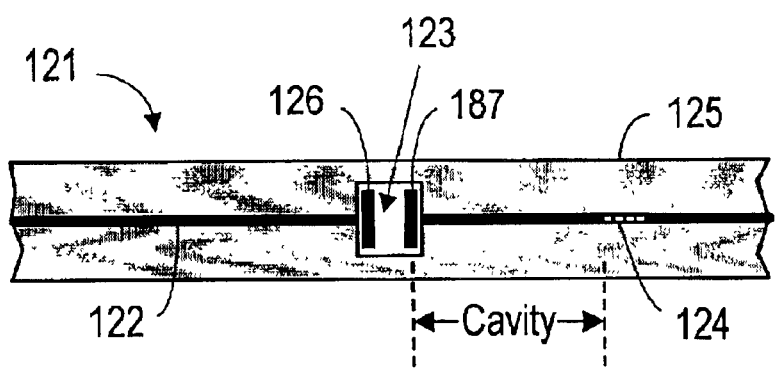

Alternatively, referring now to FIG. 9B, the surface of the waveguide exposed to the air gap adjacent to the grating may be coated with a reflective coating 127, and the other surface of the air gap may be coated with an anti-reflective coating 126. In such an arrangement, the air gap is outside of the Fabry-Perot cavity, the cavity here being the region between the reflective coating 127 and the Bragg grating.

Figure 10A:
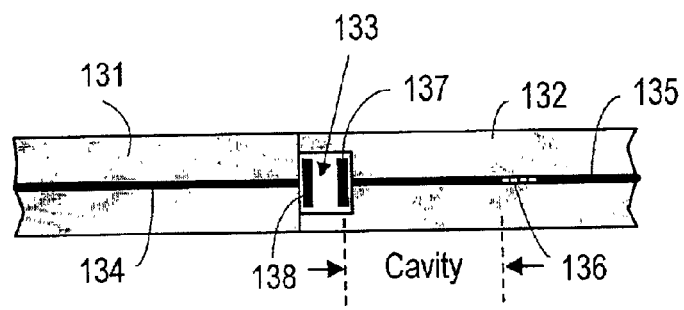
FIGS. 10A, 10B, and 10C are side views of a fifth additional alternative embodiment of a tunable Fabry-Perot optical structure according to the invention.

Referring now to FIG. 10A, in an alternative embodiment of the invention, a Fabry-Perot filter/resonator is formed of a pair of large-diameter waveguides or cane waveguides, an input waveguide 131 and an output waveguide 132, that are spliced together (for example by fusion, epoxy, liquid silica, or other known method). The Fabry-Perot filter/resonator includes an air gap 133 separating the two cores 134, 135; it is formed by removing the material to a predetermined depth along the core of the output waveguide. The material may be removed by any known method such as machining or grinding or etching or similar method. A partially reflective material is sputtered/coated on the surface of the axial portion of the output waveguide, forming a reflective coating 137 that serves as one reflective surface of the Fabry-Perot cavity. The output waveguide includes a Bragg grating 136 written into the core to provide the second reflective surface of the Fabry-Perot filter/resonator. The spacing between the reflective coating 137 and the Bragg grating 136 corresponds to the desired cavity length of the Fabry-Perot cavity.

The partial reflective coating 137 (which can be closer in thickness to the depth of the air gap than is shown in FIG. 10A) must be thin enough that when the cane waveguides 131 132 are compressed to tune the Bragg grating, the partial reflective coating does not also compress, since it might be distorted under compression and not reflect axially.

In addition to providing the reflective coating 137 on the output waveguide 132, an anti-reflective coating 138 is preferably provided on the end of the input waveguide 131 at the air gap 133.

As would be clear to one of skill in the art, the reflective coating 137 and the anti-reflective coating 138 of FIG. 10A may be switched, in which case the cavity would include the air gap 133, where in FIG. 10A, the air gap 133 is shown as outside of the cavity of the Fabry-Perot filter/resonator.

Figure 10B:
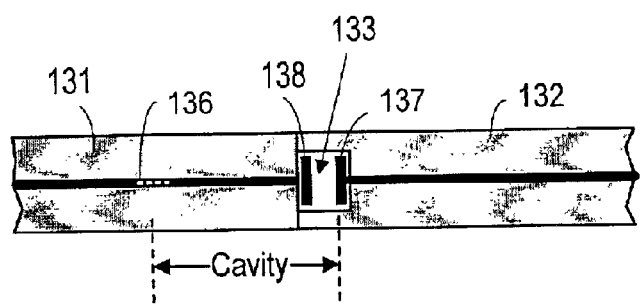

Referring now to FIG. 10B, in another alternative embodiment of the invention, a Fabry-Perot filter/resonator is substantially the same as that shown in FIG. 10A, except that the Bragg grating 136 is written in the core of the input waveguide 131.

Figure 10C:
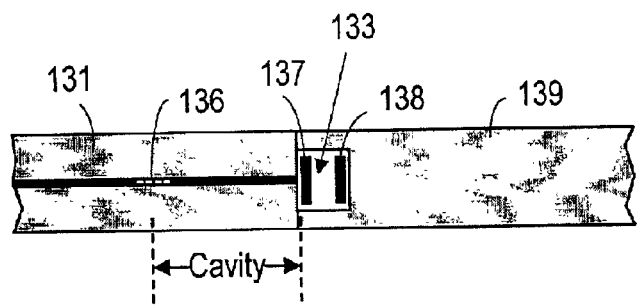

Referring now to FIG. 10C, in yet another alternative embodiment of the invention, a Fabry-Perot is substantially the same as that shown in FIG. 10B, except that the output cane waveguide 132 of FIG. 10B is replaced by a non-waveguide element 139, such as a glass rod or other material that would serve to transmit a compressive force to the input waveguide 131 when combined with the system shown in FIG. 1. In the embodiment shown in FIG. 10C, light enters waveguide 131, reflects off surface 138, and enters a resonant condition established by the grating 136 and the reflective surface 138. Light at the resonant wavelength is transmitted out of the device through waveguide 131 into a transmission fiber (not shown).

Figure 11A:
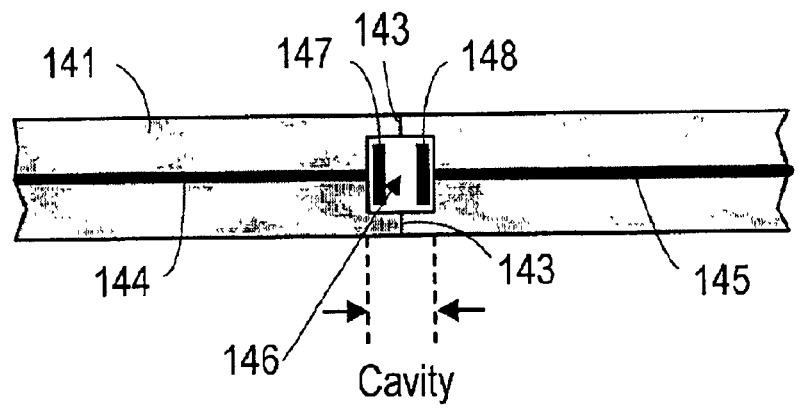
FIGS. 11A and 11B are side views of a sixth additional alternative embodiment of a tunable Fabry-Perot optical structure according to the invention.

Referring now to FIG. 11A, in another alternative embodiment of the invention, a Fabry-Perot resonator is formed of an input waveguide 141 and an output waveguide 142, both of which are large-diameter waveguides or cane waveguides and that are spliced together 143, but only outside of the cores 144, 145, i.e. the cladding portions, of the two waveguides, which are themselves separated by an air gap 146. Coatings 147 148 that are at least partially reflective are applied to the ends of each waveguide at the air gap, i.e. at the ends of the cores 144, 145. The coatings 147, 148 provide the two reflective surfaces of the Fabry-Perot cavity. The spacing between the at least partially reflective coatings 147, 148 at either end of the air gap 146 corresponds to the desired cavity length of the Fabry-Perot cavity.

To provide the air gap, an axial portion of one end of both the input and output waveguides 141, 142 is countersunk by, for example, machining or grinding counter bores to a pre-determined depth. The thickness of the partial reflective coatings 147, 148 must be less than the depth of the counter bores so that compression of the cane waveguides to change the spacing of the air gap does not compress and distort the reflective coatings.

Figure 11B:
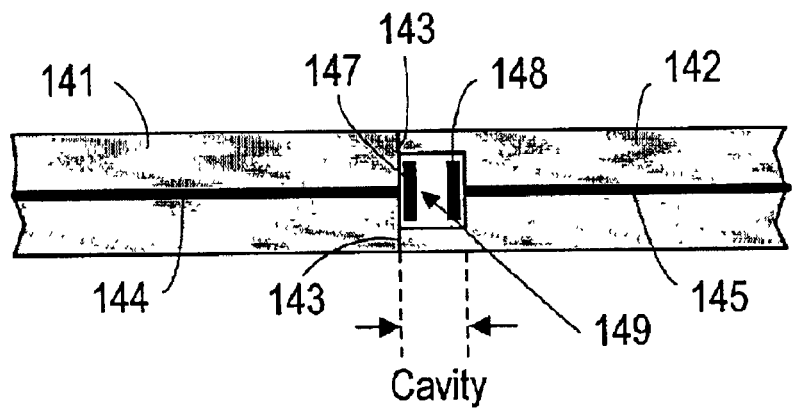

Referring now to FIG. 11B, in a variation of the embodiment of FIG. 11A, the end surface of only one of the waveguides, such as the output waveguide 142, is provided with a counter bore portion to provide an air gap 149, and at least partially reflective coatings 147 148 are provided on the cores 144 145 of the optical waveguides 141 142 at the air gap 149 so provided.

All of the above embodiments may be used in an optical filter (or resonator) device, either a passive filter/resonator (i.e. not tunable) a tunable filter/resonator (in which an axial compressive load is applied to the device to tune it, or the device is heated with a variable heating element, causing the grating to expand or shrink and so tuning it).

Figure 12:
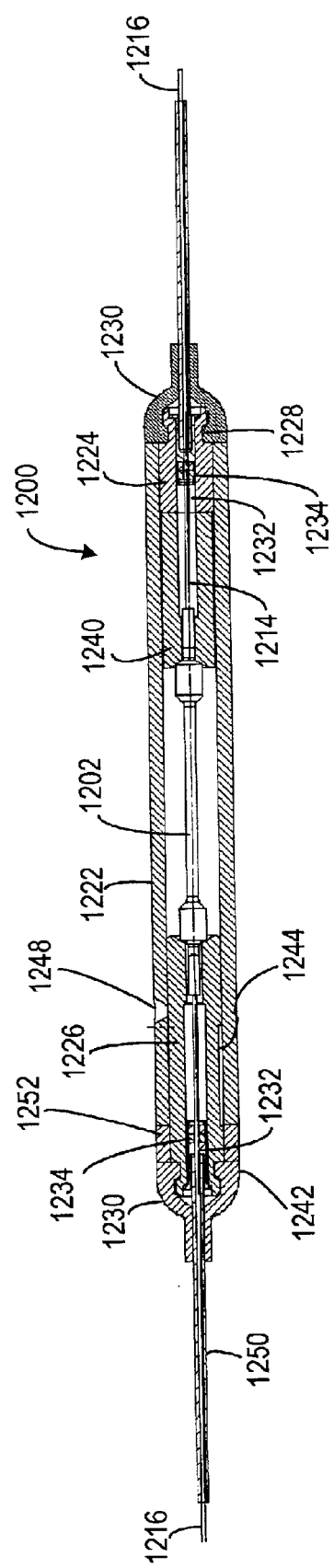
FIG. 12 is a schematic of an athermalized cane waveguide structure, from which a Fabry-Perot optical structure according to the invention can be made.

The embodiments may also be used in athermal devices, such as devices that include the above embodiments in a housing of which portions are heated or cooled so as to counter the effects of changes in the ambient temperature, or devices that include the above embodiments in a housing constructed using temperature-compensating materials (materials having different coefficients of thermal expansion) as discussed in U.S. patent application having Ser. No. 09/699,940 and entitled, Temperature Compensated Optical Device, incorporated herein by reference, according to which, as indicated in FIG. 12, an athermal device 1200 includes a cane waveguide structure 1202 (from which a Fabry-Perot optical structure would be fashioned according to the present invention), attached pigtail assemblies 1214, and a compensating spacer or rod 1240, disposed in a tubular housing 1222 formed of a high strength metal or metal alloy material, preferably having a low CTE that is higher than silica. A fixed end cap 1224 and an adjustable end cap 1226, which are formed of similar material as the housing are welded in respective ends of the housing 1222 to secure and maintain in axial alignment the optical waveguide and compensating spacer 1240. Both the fixed end cap 1224 and the adjustable end cap 1226 extend outward from the end of the housing 1222, and include a circumferential groove 1228 for receiving a respective strain relief boot 1230. Further, the fixed end cap 1224 and the adjustable end cap 1226 include a bore 1232 for receiving a respective strain relief device 1234 and for passing the optical fiber 1216 of the pigtail assemblies 1214 therethrough. The compensating spacer or rod 1240 is disposed between the fixed end cap 1224 and the optical waveguide 1202. The spacer 1240 includes a stepped bore disposed axially for receiving the pigtail assembly 1214 therethrough. The stepped bore has a diameter greater than the inner portion of the bore of the spacer to assure that no contact occurs between the spacer and the fiber during expansion and contraction of the athermal device 1200. The spacer 1240 is formed of a metal or metal alloy, such as steel, stainless steel, aluminum, high expansion alloy. The CTEs and lengths of the optical waveguide, the end caps and the spacer are selected such that the reflection wavelength of the grating 1204 does not substantially change over a predetermined temperature range (i.e., over a temperature range of length 100° C. about any expected operating temperature). More specifically, the length of the spacer 1240 is sized to offset the upward grating wavelength shift due to temperature and the thermal expansion of the housing, waveguide and end caps. As the temperature increases, the spacer length expands faster than the optical waveguide, which shifts the grating wavelength down to balance the intrinsic wavelength shift up with increasing temperature. The length of the adjustable end cap is longer than the fixed end cap 1224. Additionally, a pair of planar surfaces 1244 (only one surface being visible in FIG. 12 because the other is spaced 120° from the one shown, putting the other either in the cut out portion or behind the plane of the drawing) are ground or formed in the outer surface of the adjustable end cap 1226 to maintain the adjustable end cap in a fixed rotational orientation to the housing 1222 and optical waveguide 1202, during adjustment and mechanical burn-in process. The planar surfaces 1244 are spaced radially at a predetermined angle (e.g. 120 degrees) and extend axially a predetermined length (i.e. 0.290 in.) to permit axial movement while maintaining the adjustable end cap 1226 rotationally fixed. The planar surface align with a pair of holes (not shown) disposed in the housing 1222, which are radially spaced 120 degrees. The holes in the housing 1222 receive a pair of spring-loaded pins (not shown), which are disposed within a collar (not shown) mounted on the outer surface of the housing during assembly. The pins extend through the holes (not shown) to engage the planar surfaces 1244 of the adjustable end cap 1226, while the collar temporarily clamps the housing to the adjustable end cap.

To complete the assembly of the athermal device 1200, a ring 1252, having a width substantially equal to the distance between the end of the housing 1222 and the strain relief boot 1230, is placed over the adjustable end cap 1226. The strain relief boots 1230, which are formed of a polymer (e.g., Santoprene), are then snap fit into the grooves 1228 of the end caps 1242, 1226.

Still referring to FIG. 12, a plastic tube or ferrule 1250 is provided for strain relief, and a hole 1248 is provided for welding endcaps 1226 to the outer tube or housing 1222.

It should be understood by those skilled in the art that all though the embodiments described herein refer to the Fabry-Perot gap as an "air gap" that the gap may also be occupied by a variety of materials including but not limited to fluids, plastics, metals, gels and other known, contemplated or future materials that produce the desired wavelength management effects described herein above.

It should be understood that any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the scope of the present invention.

We claim:

1. An apparatus, comprising: a large-diameter elongated optical waveguide having a core and having an air gap region oriented along the longitudinal axis of the waveguide substantially coincident with a length of the core so as to provide an interval of the waveguide with the core removed, and with the air gap region enclosed by end faces substantially perpendicular to the longitudinal axis of the waveguide, the waveguide also having a cavity delimited on at least one side by an endface of the air gap, wherein the endface is at least partially reflective, wherein the large-diameter elongated optical waveguide has a longitudinal dimension and a transverse dimension perpendicular to the longitudinal dimension, and wherein the transverse dimension is at least 0.3 mm.

2. An apparatus as in claim 1, wherein the cavity is further delimited by the other of the two endfaces of the air gap.

3. An apparatus as in claim 1, wherein the large-diameter elongated optical waveguide is either a cane type of large-diameter elongated optical waveguide, or is a type of large-diameter elongated optical waveguide having at least one fiber fused within a tube along substantially the length of the tube.

4. An apparatus, comprising: a large-diameter elongated optical waveguide having a core and having an air gap region oriented along the longitudinal axis of the waveguide substantially coincident with a length of the core so as to provide an interval of the waveguide with the core removed, and with the air gap region enclosed by end faces substantially perpendicular to the longitudinal axis of the waveguide, the waveguide also having a cavity delimited on at least one side by an endface of the air gap, wherein the endface is at least partially reflective, wherein the cavity is further delimited by the other of the two endfaces of the air gap, and the apparatus further comprising a Bragg grating inscribed in the core of the waveguide, and wherein the cavity is further delimited by the Bragg grating.

5. An apparatus as in claim 4, wherein the air gap, the Bragg grating, and the reflectivity of the endfaces of the air gap are disposed so that the air gap is encompassed by the cavity.

6. An apparatus as in claim 4, wherein the air gap, the Bragg grating, and the reflectivity of the endfaces of the air gap are disposed so that the air gap is external to the cavity.

7. An apparatus, comprising:
  a) a force-applying assembly, responsive to a control signal containing information about a selected resonated wavelength or a selected filtered wavelength derived from an optical signal, for providing a force; and
  b) a Fabry-Perot optical structure, responsive to the force, and further responsive to the optical signal, for providing a Fabry-Perot optical structure signal either with the selected resonated wavelength or without the selected filtered wavelength;
    wherein the Fabry-Perot optical structure comprises a large-diameter elongated optical waveguide having a core and having an air gap region oriented along the longitudinal axis of the waveguide substantially coincident with a length of the core so as to provide an interval of the waveguide with the core removed, and with the air gap region enclosed by end faces substantially perpendicular to the longitudinal axis of the waveguide, the waveguide also having a cavity delimited on at least one side by an endface of the air gap, wherein the endface is at least partially reflective.

8. An apparatus according to claim 7, wherein the Fabry-Perot optical structure is a dogbone structure having wider end portions separated by a narrower intermediate portion.

9. A optical device according to claim 8, wherein the narrower intermediate portion has a Fabry-Perot interferometer cavity disposed therein.

10. A optical device according to claim 7,
  wherein the force-applying assembly includes a piezoelectric actuator arranged in a housing; and
  wherein the Fabry-Perot optical structure is arranged between a wall of the housing and the piezoelectric actuator under slight compression.

11. A optical device according to claim 7, wherein the control signal is an applied stepper voltage signal.

12. An apparatus according to claim 7, wherein the Fabry-Perot optical structure is a cylindrical tubular structure.

13. An apparatus according to claim 7, wherein the force is a compression force that presses or squeezes the Fabry-Perot optical structure.

14. An apparatus according to claim 7, wherein the force is a tension force that pulls, stretches, or elongates the Fabry-Perot optical structure.

15. A optical device according to claim 7, wherein the Fabry-Perot optical structure is a dogbone structure in the form of a single large diameter waveguide known as a cane waveguide structure.

16. An apparatus according to claim 7, wherein the Fabry-Perot optical device is an optical filtering device, an optical sensing device or an optical resonating device.

17. An apparatus according to claim 7, wherein one or more of the fiber end faces are coated with a high reflectivity coating.

18. An apparatus according to claim 7, wherein the Fabry-Perot optical structure includes a glass tube having a perpendicular slit to form a Fabry-Perot cavity therein.

19. An apparatus according to claim 18, wherein the glass tube has an core and an etched area, and the core has coated faces.

20. An apparatus according to claim 19, wherein the perpendicular slit cuts across the core.

21. An apparatus according to claim 7, wherein the Fabry-Perot optical structure includes a glass tube having a parallel slit to form a Fabry-Perot cavity therein.

22. An apparatus according to claim 21, wherein the glass tube has an core and an etched area, and the core has coated faces.

23. An apparatus according to claim 22, wherein the parallel slit cuts across the core.

24. An apparatus according to claim 7,
  wherein the Fabry-Perot optical structure has a longitudinal axis;
  wherein the Fabry-Perot optical structure has a Fabry-Perot structure arranged along the longitudinal axis; and
  wherein the force is applied along the longitudinal axis.

25. An apparatus according to claim 24, wherein the force is an axial compression force.

26. An apparatus according to claim 25, wherein the force is an axial tension force.

27. An apparatus according to claim 7, wherein the Fabry-Perot optical structure includes a glass tube having a bore with two fibers positioned therein, the glass tube being collapsed onto the two fibers leaving the air gap between two fiber end faces of the two fibers.

28. An apparatus according to claim 27, wherein the air gap between the fiber end faces is an interferometric cavity.

29. An apparatus as in claim 7, wherein the large-diameter elongated optical waveguide is either a cane type of large-diameter elongated optical waveguide, or is a type of large-diameter elongated optical waveguide having at least one fiber fused within a tube along substantially the length of the tube, wherein the large-diameter elongated optical waveguide has a longitudinal dimension and a transverse dimension perpendicular to the longitudinal dimension, and wherein the transverse dimension is at least 0.3 mm.

30. An apparatus according to claim 7, wherein the Fabry-Perot optical structure comprises an input optical fiber and an output optical fiber arranged end to end with the air gap between them and onto which a dielectric tube is collapsed and fused, wherein the output optical fiber has a Bragg grating, and further comprising an at least partially reflective coating provided within the air gap, on either of the ends of the two optical fibers terminating at the air gap.

31. An apparatus according to claim 7, wherein the Fabry-Perot optical structure comprises a large-diameter optical waveguide having a core, from which a section of the core has been removed to provide the air gap, leaving behind at least some of the adjacent cladding, and including a Bragg grating on one side of the air gap, and further comprising an at least partially reflective coating provided within the air gap, on either of the ends of the core of the large-diameter optical waveguide terminating at the air gap.

32. An apparatus according to claim 7, wherein the Fabry-Perot optical structure comprises two large-diameter optical waveguides fusion-spliced together end-to-end, each having a core, wherein a section of the core has been removed from one of the large-diameter optical waveguides to provide the air gap, the removing being performed so as to leave behind at least some of the adjacent cladding, and wherein a Bragg grating is provided in the core of one of the large-diameter optical waveguides, and further comprising an at least partially reflective coating provided within the air gap, on either of the ends of the cores of the large-diameter optical waveguides terminating at the air gap.

33. An apparatus according to claim 7, wherein the Fabry-Perot optical structure comprises a large-diameter optical waveguides fusion-spliced together end-to-end with a non-waveguide element, the large-diameter optical waveguides having a core, wherein a section of the non-waveguide element has been removed so as to provide the air gap, and wherein a Bragg grating is provided in the core of the large-diameter optical waveguide, and further comprising a partially reflective coating provided within the air gap on the end of the core of the large-diameter optical waveguide terminating at the air gap, and a reflective coating on the end of the non-waveguide element terminating at the air gap.

34. An apparatus according to claim 7, wherein the Fabry-Perot optical structure comprises two large-diameter optical waveguides fusion-spliced together end-to-end, each having a core, wherein a section of the core has been removed from at least one of the large-diameter optical waveguides to provide the air gap, the removing being performed so as to leave behind at least some of the adjacent cladding, and further comprising an at least partially reflective coating on each of the ends of the cores of the large-diameter optical waveguides terminating at the air gap.

\* \* \* \* \*

UNITED STATES PATENT AND TRADEMARK OFFICE
CERTIFICATE OF CORRECTION

PATENT NO. : 6,915,048 B2
DATED : July 5, 2005
INVENTOR(S) : Kersey et al.

It is certified that error appears in the above-identified patent and that said Letters Patent is hereby corrected as shown below:

Column 8,
Line 42, please delete "7114" and substitute -- 752 -- therefor.
Line 52, please delete "1140" and substitute -- 250 -- therefor.

Signed and Sealed this

Eighth Day of November, 2005

JON W. DUDAS
*Director of the United States Patent and Trademark Office*